(12) United States Patent
Li et al.

(10) Patent No.: US 9,256,532 B2
(45) Date of Patent: Feb. 9, 2016

(54) METHOD AND COMPUTER SYSTEM FOR MEMORY MANAGEMENT ON VIRTUAL MACHINE

(71) Applicant: Industrial Technology Research Institute, Hsinchu (TW)

(72) Inventors: Han-Lin Li, Taoyuan County (TW); Tzi-Cker Chiueh, Taipei (TW); Jui-Hao Chiang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 294 days.

(21) Appl. No.: 13/951,472

(22) Filed: Jul. 26, 2013

(65) Prior Publication Data

US 2014/0108700 A1    Apr. 17, 2014

Related U.S. Application Data

(60) Provisional application No. 61/712,279, filed on Oct. 11, 2012.

(51) Int. Cl.
*G06F 12/08* (2006.01)
*G06F 9/455* (2006.01)
(Continued)

(52) U.S. Cl.
CPC .............. *G06F 12/08* (2013.01); *G06F 9/455* (2013.01); *G06F 9/45533* (2013.01); *G06F 9/45558* (2013.01); *G06F 12/02* (2013.01); *G06F 12/0223* (2013.01); *G06F 12/0253* (2013.01);
(Continued)

(58) Field of Classification Search
CPC . G06F 12/08; G06F 9/5016; G06F 2212/205; G06F 12/121; G06F 2212/657; G06F 12/02; G06F 12/0223; G06F 12/023; G06F 12/0253; G06F 12/109; G06F 12/123; G06F 2009/45583; G06F 9/455; G06F 9/45533; G06F 9/45558; G06F 12/12
See application file for complete search history.

(56) References Cited

U.S. PATENT DOCUMENTS 4,422,145 A    12/1983    Sacco et al.
6,131,150 A    10/2000    DeTreville
(Continued)

FOREIGN PATENT DOCUMENTS

TW    I356301    1/2012
TW    201322134    6/2013

OTHER PUBLICATIONS

Gupta, "Compcache: in-memory compressed swapping," Eklektix, Inc., May 26, 2009, pp. 1-8.
(Continued)

*Primary Examiner* — Hashem Farrokh
(74) *Attorney, Agent, or Firm* — Jianq Chyun IP Office

(57) ABSTRACT

A method and a computer system for memory management on a virtual machine system are provided. The memory management method includes the following steps. A least recently used (LRU) list is maintained by at least one processor according to a last access time, wherein the LRU list includes a plurality of memory pages. A first portion of the memory pages are stored in a virtual memory, a second portion of the memory pages are stored in a zram driver, and a third portion of the memory pages are stored in at least one swap disk. A space in the zram driver is set by the at least one processor. The space in the zram driver is adjusted by the processor according to a plurality of access probabilities of the memory pages in the zram driver, an overhead of a pseudo page fault, and an overhead of a true page fault.

20 Claims, 2 Drawing Sheets

(51) Int. Cl.
*G06F 12/02* (2006.01)
*G06F 12/10* (2006.01)
*G06F 12/12* (2006.01)

(52) U.S. Cl.
CPC ............ *G06F 12/109* (2013.01); *G06F 12/123* (2013.01); *G06F 2009/45583* (2013.01)

(56) References Cited

U.S. PATENT DOCUMENTS

| | | |
|---|---|---|
| 6,516,397 B2 | 2/2003 | Roy et al. |
| 6,658,549 B2 | 12/2003 | Wilson et al. |
| 6,658,648 B1 | 12/2003 | Douceur et al. |
| 6,681,305 B1 | 1/2004 | Franke et al. |
| 6,804,754 B1 | 10/2004 | Franaszek et al. |
| 6,854,115 B1 | 2/2005 | Traversat et al. |
| 6,877,081 B2 | 4/2005 | Herger et al. |
| 6,910,106 B2 | 6/2005 | Sechrest et al. |
| 7,003,646 B2 | 2/2006 | Roy et al. |
| 7,007,150 B2 | 2/2006 | Valentin et al. |
| 7,127,560 B2 | 10/2006 | Cohen et al. |
| 7,181,736 B2 | 2/2007 | Douceur et al. |
| 7,380,089 B2 | 5/2008 | Herger et al. |
| 7,500,077 B2 | 3/2009 | Krauss |
| 7,516,291 B2 | 4/2009 | van Riel et al. |
| 7,698,513 B2 | 4/2010 | Sechrest et al. |
| 7,844,793 B2 | 11/2010 | Herger et al. |
| 7,934,035 B2 | 4/2011 | Miloushev et al. |
| 8,032,723 B2 | 10/2011 | Sechrest et al. |
| 8,099,487 B1 | 1/2012 | Smirnov et al. |
| 8,141,058 B2 | 3/2012 | Berg et al. |
| 8,161,260 B2 | 4/2012 | Srinivasan |
| 2008/0109629 A1* | 5/2008 | Karamcheti et al. .......... 711/170 |
| 2011/0138147 A1 | 6/2011 | Knowles et al. |
| 2012/0036325 A1* | 2/2012 | Mashtizadeh et al. ........ 711/118 |
| 2013/0091321 A1* | 4/2013 | Nishtala et al. ............... 711/103 |

OTHER PUBLICATIONS

Ghalimi, "Cloud Computing is Memory Bound" Intalio, Inc., May 2010, pp. 1-10.
Cook, "Memory: The Real Data Center Bottleneck," SYS-CON Media Inc., Dec. 10, 2009, pp. 1-3.
Williams et al., "Overdriver: Handling Memory Overload in an Oversubscribed Cloud," Proceedings of the 7th ACM SIGPLAN/SIGOPS international conference on Virtual execution environments, VEE '11, Mar. 9-11, 2011, pp. 205-216.
Waldspurger, "Memory Resource Management in VMware ESX Server," Proceedings of the 5th Symposium on Operating Systems Design and Implementation (OSDI' 02), Dec. 2002, pp. 1-14.
Lu et al., "Virtual Machine Memory Access Tracing With Hypervisor Exclusive Cache," Proceedings of the USENIX Annual Technical Conference (USENIX'07), Jun. 2007, pp. 1-15.
Zhao et al., "Dynamic Memory Balancing for Virtual Machines," VEE '09, Mar. 11-13, 2009, pp. 21-30.
Magenheimer, "add self-ballooning to balloon driver," Xen. org, Apr. 24, 2008, pp. 1-2.
Gupta et al., "Difference Engine: Harnessing Memory Redundancy in Virtual Machines," OSDI '08, Oct. 2008, pp. 1-14.
Magenheimer, "Transcendent Memory on Xen," Xen Summit, Feb. 2009, pp. 1-3.
"Office Action of Taiwan Counterpart Application", issued on Aug. 21, 2015, p. 1-p. 6.

* cited by examiner

METHOD AND COMPUTER SYSTEM FOR MEMORY MANAGEMENT ON VIRTUAL MACHINE

CROSS-REFERENCE TO RELATED APPLICATION

This application claims the priority benefits of U.S. provisional application Ser. No. 61/712,279, filed on Oct. 11, 2012. The entirety of the above-mentioned patent applications is hereby incorporated by reference herein and made a part of this specification.

TECHNICAL FIELD

The disclosure relates to a technique of memory management on a virtual machine.

BACKGROUND

Computer virtualization is a technique involved in creation of a virtual machine that acts like a physical computing machine with an operating system, and a computer virtualization architecture is generally defined by the ability to concurrently support multiple operating systems on a single physical computer platform. For example, a computer that is running Microsoft Windows may host a virtual machine with a Linux operating system. A host machine is an actual physical machine on which the virtualization takes place, while a virtual machine is considered as a guest machine. A hypervisor, literally referred to as a virtual machine monitor (VMM), is a software layer that virtualizes hardware resources and presents a virtual hardware interface to at least one virtual machine. The hypervisor resembles to the way that a traditional operating system manages the hardware resources for processing and performs certain management functions with respect to an executing virtual machine. The virtual machine may be referred to as a "guest" and the operating system running inside the virtual machine may be referred to as a "guest OS".

The virtualized environment is currently memory-bound, which means that the physical memory of the host machine is the bottleneck of the resource utilization in a data center. Memory virtualization decouples the physical memory resources from the data center and then aggregates the resources into a virtualized memory pool which is accessible to the guest OS or applications running on top of the guest OS. In terms of memory virtualization, memory compression is one of the crucial topics to the memory resource management and utilization.

Similar to the traditional operating system, the last resort to increase memory utilization of the hypervisor is to reclaim the memory from the virtual machine by host swapping, i.e., to shift the memory pages of virtual machines to a physical swap disk, referred to as swap-out, mark a corresponding page table entry (PTE) of the virtual machines' physical address to machine address (P2M) table to be not-present, and then free the corresponding page to the free memory pool of the hypervisor, wherein the page table is a data structure used by the virtual machines to store the mapping between the virtual addresses and physical addresses. Later on, if the page is accessed again by the virtual machine, a page fault is triggered and the copy-on access (COA) mechanism is performed to bring the page content from a swap disk into a newly allocated memory page, referred to as swap-in. However, the overhead is highly unsatisfactory due to the long latency of disk input/output (I/O).

As another way to increase the memory utilization, memory compression may be done by compressing swapped-out pages of the virtual machines into smaller size of data and putting them together in a memory to save the physical memory disk used to store the original content. That is, memory compression may substantially mitigate the performance degradation due to memory pressures. The idea is that the swapin from compressed memory would be faster than the swapin from the disk, because the memory access is faster than the disk access.

As to compress the swapped-out pages, a zram driver, an experimental module of a Linux kernel, may present as a swap disk in the virtual machines, compress and store the swapped-out pages in guest memory. With the zram driver, the pseudo page fault may trigger the compressed pages of the zram driver to be decompressed and stored into a newly allocated guest memory page, which is intuitively faster than the real page fault from the swap disk. Nonetheless, to store the compressed pages in the zram driver, the guest OS needs to consume the guest memory and may bring more swap-in/out operations. To resolve such dilemma, the size of the zram driver may require to be adjusted dynamically.

SUMMARY

The disclosure embodiment provides a memory management method for a virtual machine system. The memory management method includes the following steps. First, a least recently used (LRU) list is maintained by at least one processor according to a last access time, wherein the LRU list includes a plurality of memory pages. A first portion of the memory pages are stored in a virtual memory on the virtual machine system, a second portion of the memory pages are stored in a zram driver on the virtual machine system, and a third portion of the memory pages are stored in at least one swap disk. A space in the zram driver is set by the at least one processor. Then, the space in the zram driver is adjusted by the at least one processor according to a plurality of access probabilities of the memory pages in the zram driver, an overhead of a pseudo page fault, and an overhead of a true page fault.

The disclosure embodiment provides a computer system including at least one system memory, at least one swap disk, and at least one processor. The swap disk is coupled to the at least one system memory, and the at least one processor is coupled to the at least one system memory and performs the following operation for memory management on a virtual machine system. The at least one processor maintains a LRU list according to a last access time, wherein the LRU list includes a plurality of memory pages. A first portion of the memory pages are stored in a virtual memory on the virtual machine system, a second portion of the memory pages are stored in a zram driver on the virtual machine system, and a third portion of the memory pages are stored in at least one swap disk. The at least one processor sets a space in the zram driver and adjusts the space of the zram driver according to a plurality of access probabilities of the memory pages in the zram driver, an overhead of a pseudo page fault, and an overhead of a true page fault.

Several exemplary embodiments accompanied with figures are described in detail below to further describe the disclosure in details.

BRIEF DESCRIPTION OF THE DRAWINGS

The accompanying drawings are included to provide a further understanding of the disclosure and are incorporated in and constitute a part of this specification. The drawings serve to illustrate exemplary embodiments of the disclosure and, taken together with the description, serve to explain the principles of the disclosure. However, they are not intended to limit the scope of the disclosure, which is defined by the accompany claims.

DETAILED DESCRIPTION OF DISCLOSED EMBODIMENTS

Figure 1A:
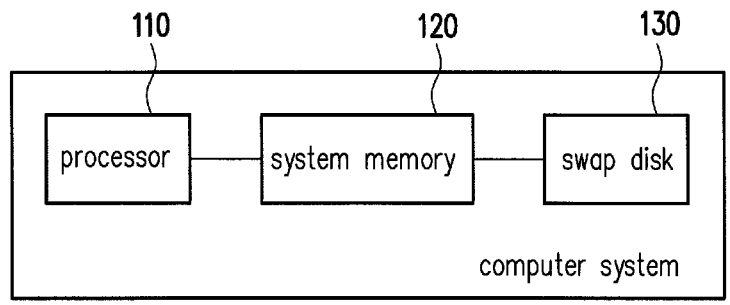
FIG. 1A is a block diagram of a computer system according to an exemplary embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

For illustration purpose, one processor, one system memory, one swap disk, etc, are used in the following exemplary embodiments, and yet the present disclosure is not limited thereto. In other exemplary embodiments, more than one processor, more than one system memory, more than one swap disk, etc, could be used.

FIG. 1A is a block diagram of a computer system according to an exemplary embodiment of the present disclosure. Referring to FIG. 1, a computer system 100 includes a processor 110, a system memory 120, a swap disk 130, and other standard peripheral components (not shown). The system memory 120 is coupled to the processor 110, and the swap disk 130 is coupled to the system memory 120.

The processor 110 may be a dedicated or specialized processor configured to perform particular tasks by executing machine-readable software code languages that define functions related to operations to carry out the functional operations by communicating with other components of the computer system 100.

The system memory 120 stores software such as an operating system and temporarily stores data or application programs which are currently active or frequently used. Hence, the system memory 120, also referred to as a physical memory, may be a faster memory such as random access memory (RAM), a static random access memory (SRAM), or a dynamic random access memory (DRAM) for much faster access time.

The swap disk 130 is configured for storing and retrieving data. For example, the swap disk 130 may be an area on a hard disk drive (HDD) or a solid state drive (SSD) on the computer system 100 to offload excessive data from the system memory 120.

Virtual memory is a technique for managing the resources of the system memory 120. It provides an illusion of a large amount of memory. Both the virtual memory and the system memory 120 are divided into blocks of contiguous memory addresses, which are also referred to as memory pages. The system memory 120 may, for example, include a compressed memory, which is associated with at least one virtual machine running on the computer system 100. The compressed memory temporarily stores less recently accessed memory pages in a compressed format to make more spaces available in the system memory 120. For implementation, a Linux guest OS is specifically focused and yet the present disclosure may also be leveraged to other guest OSs such as Microsoft Windows. In one of exemplary embodiments, a zram driver, a module of the Linux kernel, is inserted into the Linux guest OS as a virtual disk device and configured as a swap device by a system management tool (i.e. swapon) of the Linux guest OS, so that all swap-in and swap-out operations enter the zram driver as disk I/O requests. A hypervisor is installed on the computer system 100 and supports virtual machine execution space within which at least one virtual machine may be concurrently instantiated and executed.

Figure 1B:
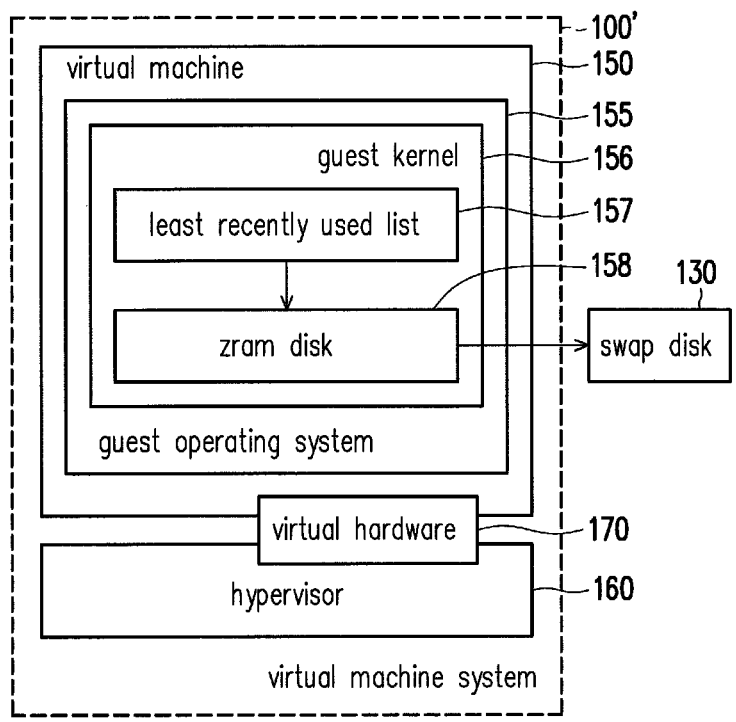
FIG. 1B is a block diagram of a virtual machine system according to an exemplary embodiment of the present disclosure.

FIG. 1B is a block diagram of a virtual machine system according to an exemplary embodiment of the present disclosure. In the present exemplary embodiment, only one virtual machine will be illustrated for simplicity, and yet the present disclosure is not limited thereto. In other exemplary embodiments, multiple virtual machines may co-exist and perform operations in a similar fashion.

Referring to FIG. 1B along with FIG. 1A, a virtual machine system 100' includes a virtual machine 150 with a guest OS 155 and other applications (not shown), a hypervisor 160, and a virtual hardware 170. The guest OS 155 includes a guest kernel 156 with a LRU list 157 and a zram driver 158. The virtual hardware 170 including a processor, a memory, and I/O devices is abstracted and allocated as a virtual processor, a virtual memory, and virtual I/O devices to the upper running virtual machine 150. The hypervisor 160 manages the virtual machine 150 and provides emulated hardware and firmware resources. In one of exemplary embodiments, a Linux distribution may be installed as the guest OS 155 within the virtual machine 150 to execute any supported application, and open source software Xen supporting most Linux distributions may be provided as the hypervisor 160, and the guest kernel 156 may be the domU kernel. In conjunction with the hypervisor 160, a balloon driver may allocate or de-allocate the virtual memory for the guest OS 155 by invoking memory management algorithms. Memory compression may be efficiently done by leveraging the page reclamation mechanism and compressing the memory pages outside of a working set of the virtual machine 150. Intuitively speaking, the working set of the virtual machine 150 is defined as the amount of memory being actively used by the virtual machine 150 in the recent past.

For page reclamation, the processor 110 uses a least recently used (LRU) criteria to determine an order in which to evict pages and maintains the LRU list 157 that orders all the memory pages ever accessed by the virtual machine 150 according to the last access time for two major types of memory: an anonymous memory and a page cache. The memory pages of the anonymous memory are used by the heap and stack of user processes, and the memory pages of the page cache are backed by disk data where the content is cached in memory after the first access to the disk data to reduce future disk I/O. The memory pages accessed more frequently are referred to as hot pages; the pages accessed less frequently are referred to as cold pages.

On a virtual machine system, if a memory page on the LRU list is the anonymous memory, a guest kernel may swap the content to a swap disk, mark the corresponding PTE of the process to be not-present, and then free the corresponding memory page. Later on, if the memory page is accessed again, the COA mechanism is performed by bringing the page content from the swap disk 130 into a newly allocated memory page, i.e., swap-in. Alternatively, if the memory page on the LRU list belongs to the page cache, the guest kernel may flush the page content to the swap disk if it has been dirtied, and then the page is freed. Upon a next file access, the guest kernel has to again perform the disk access, referred to as refault, to bring the content back to a newly allocated page in the page cache.

When the virtual memory allocated to the virtual machine 150 is between the working set and the minimum memory requirement, memory compression may substantially mitigate the performance degradation due to memory pressures. To compress evicted pages from the virtual machine 150, the zram driver 158 may intercept the swap-in and swap-out operations on the virtual machine 150. When a swapped-out page arrives at the zram driver 158, it is compressed into a sub-page size by, for example, the Lempel-Ziv-Oberhumer (LZO1X) algorithm and stored in a memory area allocated from the guest kernel 156 without being sent to the swap disk 130. One exception is zero evicted pages, which the zram driver 158 recognizes based on the page type information and skips the compression step. When a swap-in page arrives, the zram driver 158 decompresses the swap-in page and returns it to the process that causes the page fault triggering the swap-in.

In one of exemplary embodiments, the processor 110 may not compress evicted cache pages and focus on swap-in events associated with anonymous memory due to the following reasons. First, the lifetime of anonymous pages of a process is the same as that of the process itself because they are released when the process dies. However, cache pages are not explicitly owned by any process because they may be allocated by one process and then used to satisfy disk accesses by another process. Second, compared with anonymous memory pages, cache pages are typically backed by a larger disk volume and thus may require too much memory to compress. While intercepting swap-in and swap-out of anonymous memory pages is relatively straightforward because it may be done through a well-defined application programming interface (API), the same thing may not be said about intercepting eviction of cache pages, whose logic is embedded in a virtual file system (VFS) layer of the guest kernel 156.

Since the virtual machine 150 is backed by the zram driver 158 and the swap disk 130, when a page fault occurs, the missing page may be fetched from the zram driver 158, in which case the fault leads to a pseudo page fault, or from the swap disk 130, in which case the page fault leads to a true page fault. When a page is swapped in from the zram driver 158 to the swap disk 130, the overhead is mainly due to the time required to decompress the page. On the other hand, when a page is swapped out to the zram driver 158 from the swap disk 130, the overhead is mainly due to the time required to compress the page. In one of exemplary embodiments, in terms of a quantitative comparison between the swap-in time and swap-out time associated with the pseudo page fault and the true page fault, there is a factor of at least 50 differences between the overheads. The overhead of the true page fault is at least 50 times longer than the over head of the pseudo page fault.

When a larger portion of the virtual memory is given to the zram driver 158, less memory is available to the applications running on the virtual machine 150, and the pseudo page fault rate is then increased. However, as the zram driver 158 is given more memory, more memory pages are held in memory effectively due to compression, and fewer page faults may result in true page faults because they are more likely to be satisfied by the compressed pages in the zram driver 158. Therefore, the amount of memory given to the zram driver 158 represents a trade-off between the pseudo page fault rate and the true page fault rate.

Suppose the amount of memory allocated to the virtual machine 150 is M, C of which is allocated to the zram driver 158, and the average compression ratio of the pages stored in the zram driver 158 is X. The key question is to find the optimal C such that $PPFR(M,C) \times Overhead_{PPF} + TPPR(M,C) \times Overhead_{TPF}$ is minimized. $PPFR(M,C)$ is the pseudo page fault rate of the virtual machine 150 when the allocated memory is M and C of which is allocated to the zram driver 158. $TPPR(M,C)$ is the true page fault rate of the virtual machine 150 when the allocated memory size is M and C of which is allocated to the zram driver 158. To automatically deduce the optimal percentage of the allocated memory that may be assigned to the zram driver 158 and the subset of memory pages evicted to the zram driver 158 that should be sent to the swap disk 130, the processor 110 may dynamically adjust a space of the zram driver 158 as shown in FIG. 2.

Figure 2:
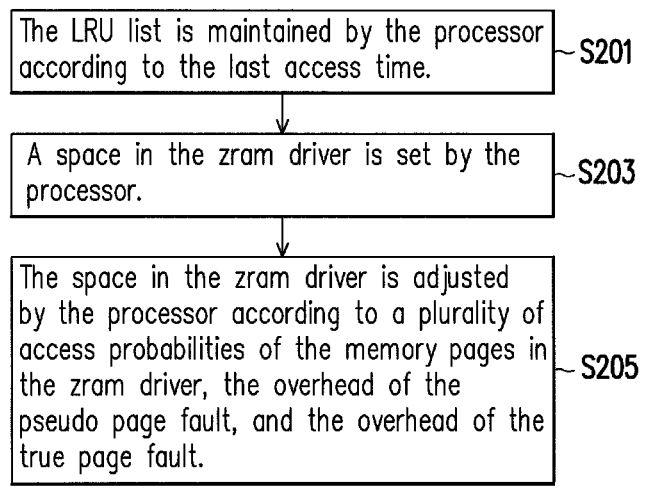
FIG. 2 is a flowchart illustrating a method for memory management on a virtual machine according to an exemplary embodiment of the present disclosure.

FIG. 2 is a flowchart illustrating a method for memory management on a virtual machine according to an exemplary embodiment of the present disclosure.

Referring to FIG. 2 along with the components in FIG. 1A and FIG. 1B, the LRU list 157 is maintained by the processor 110 according to the last access time (Step S201). The memory pages stored in the LRU list 157 are divided into three portions. A first portion of the memory pages on the LRU list 157 are stored in the virtual memory (not shown) outside the zram driver 158 in an uncompressed format. A second portion of the memory pages on the LRU list 157 are stored in the zram driver 158 in a compressed format. A third portion of the memory pages are stored in the swap disk 130.

Then, a space in the zram driver is set by the processor 110 (Step S203). In other words, the processor 110 may provide the zram driver 158 a control parameter which specifies the number of memory pages (i.e. an amount of memory) assigned to the zram driver 158. When the amount of used memory in the zram driver 158 exceeds the control parameter, the processor 110 may directs all future swapped-out memory pages from the virtual machine 150 to the swap disk 130 without attempting to compress them. Initially, the processor 110 may set the control parameter based on a balloon target of the balloon driver, a minimum memory requirement of the virtual machine system 100', and a basic memory requirement of the zram driver 158. For example, the control parameter may be a value of balloon target-MMR-$M_{zRAM}$ by default, wherein MMR is the minimum memory requirement of the virtual machine system 100', and $M_{zRAM}$ is the basic memory requirement of the zram driver 158.

In one of exemplary embodiments, assume that the number of memory pages available to the virtual machine 150 is N1, and the amount of memory allocated to the zram driver is K. According to the last access time to the memory pages, the hottest N1 memory pages (i.e. a first portion) on the LRU list 157 are stored in the virtual memory outside the zram driver 158 in an uncompressed format. The next hottest N2 memory pages (i.e. a second portion) on the LRU list 157 are stored in the zram driver 158 in a compressed format, wherein the accumulative size of the next hottest N2 memory pages is K. In other words, the $(N1+1)^{th}$ memory page to the $(N1+N2)^{th}$ memory page on the LRU list 157 are stored in the zram driver 158. The remaining memory pages (i.e. a third portion) on the LRU list are stored in the swap disk 130.

If N2 is decremented by one so that N1 is incremented by one, some of the coldest pages in the zram driver 158 in a compressed format may have to reside in the swap disk 130 and be explicitly brought into memory when they are accessed. Meanwhile, the hottest page in the zram driver 158 (i.e. the $(N1+1)^{th}$ memory page on the LRU list 157) may be held in the virtual memory. That is, the pseudo page fault rate is decreased but the true page fault rate is increased. Therefore, it is preferable to decrement the number of the memory pages assigned to the zram driver 158 if a reduction in the overhead of the pseudo page fault out-weights an increment in the overhead of the true page fault. In one of exemplary embodiments, the overhead of the pseudo page fault is a time cost of the pseudo page fault, and the overhead of the true page fault is a time cost of the true page fault. Similarly, it is preferable to increment the number of the memory pages assigned to the zram driver 158 if the reduction in the overhead of the true page fault out-weights the increment in the overhead of the pseudo page fault. Hence, the space in the zram driver 158 may be adjusted by the processor 110 according to a plurality of access probabilities of the memory pages in the zram driver 158, the overhead of the pseudo page fault, and the overhead of the true page fault (Step S205).

Since the $(N1+1)^{th}$ memory page to the $(N1+N2)^{th}$ memory page on the LRU list 157 are stored in the zram driver 158 in the present exemplary embodiment, the processor 110 decrements N2 if the condition of Eq. (1) is met:

$$AP(N1+1) \times \text{Overhead}_{PPF} > \sum_{j=N1+m}^{N1+N2} AP(j) \times \text{Overhead}_{TPF} \quad \text{Eq. (1)}$$

The left hand side of Eq. (1), defined as a base term, is related to the hottest memory page in the zram driver 158. AP(N1+1) represents the access probability of the $(N1+1)^{th}$ page on the LRU list 157, and $\text{Overhead}_{PPF}$ represents the overhead of the pseudo page fault. The right hand side of Eq. (1), defined as a comparison term, is related to the plurality of coldest memory pages in the zram driver 158. AP(j) represents an access probability of the $j^{th}$ page in the LRU list, and $\text{Overhead}_{PPF}$ represents the overhead of the true page fault. The summation of the coldest (N2−m+1) compressed memory pages is less than one memory page size, and the summation of the coldest (N2−m+2) compressed memory pages is greater than one memory page size. The processor 110 continues to decrement N2 as long as the inequality in Eq. (1) holds until N2 becomes zero. That is, the processor 110 keeps shrinking the zram drive 158 until no memory pages is able to be assigned to the zram drive 158.

It is noted that, the access probability of each of the pages on the LRU list 157 is estimated by an inverse of a page idle time by the processor 110, wherein the page idle time is a difference between each of the memory pages being swapped-out and a current time. That is, the access time of the memory pages on the LRU list may be recorded by the processor 110. The estimate of the page idle time is an approximation because it equates a swapped-out time of a memory page as its last access time. When the virtual machine 150 evicts the memory pages more frequently, the approximation is more accurate. When the virtual machine 150 does not evict pages frequently, there is no need to adjust the memory space of the zram driver 158 dynamically and the fact that such approximation is less accurate does not have much impact.

It is also noted that, the LRU list 157 includes all the memory pages accessed by the virtual machine 150 and may incurs too much performance overhead to build in practice. In another exemplary embodiment, the processor 110 may build and maintain another local LRU list based on the memory pages swapped out to the zram driver 158.

Through the aforementioned memory management method, when the memory of the system memory 120 goes lower than the working set of the virtual machine 150, the processor 110 may dynamically adjust the size of the zram driver 158 by evicting the cold memory pages in the zram driver 158 to the swap disk 130. By means that, more resources from the system memory 120 may be preserved while keeping the application performance without noticeable degradation.

In an exemplary embodiment, the above-mentioned memory management method may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

To sum up, by leveraging an existing page reclamation mechanism of a guest OS, the memory management method in the present disclosure is designed to deduce the optimal percentage of the virtual memory that should be assigned to a zram driver, and the subset of memory pages evicted to the zram driver that should be sent to a swap disk for mitigating the performance degradation due to memory pressure. Based on access probabilities of memory pages in the zram driver with overheads of a pseudo page fault and a true page fault taken into account, the amount of the memory assigned to the zram driver may be adjusted dynamically by evicting the cold memory pages in the zram driver to the swap disk and further provides advantages of memory resource management.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A memory management method for a virtual machine system, comprising:
   maintaining a least recently used (LRU) list according to a last access time by at least one processor, wherein the LRU list comprising a plurality of memory pages, and wherein a first portion of the memory pages in the LRU list are stored in a virtual memory on the virtual machine system, a second portion of the memory pages in the LRU list are stored in a zram driver on the virtual machine system, and a third portion of the memory pages in the LRU list are stored in at least one swap disk;
   setting a space in the zram driver by the at least one processor; and
   adjusting the space in the zram driver by the at least one processor according to a plurality of access probabilities of the memory pages in the zram driver, an overhead of a pseudo page fault, and an overhead of a true page fault.

2. The memory management method in claim 1, wherein a step of setting the space in the zram driver by the at least one processor comprises:
   setting the space in the zram driver by the at least one processor to a control parameter, wherein the control parameter is a number of memory pages assigned to the zram driver.

3. The memory management method in claim 1, wherein a step of the adjusting the space in the zram driver by the at least one processor according to the plurality of access probabilities of the memory pages in the zram driver, the overhead of a pseudo page fault, and the overhead of a true page fault further comprises:
   shrinking the space in the zram driver by the at least one processor according to the plurality of access probabilities of the memory pages in the zram driver, the overhead of a pseudo page fault, and the overhead of a true page fault.

4. The memory management method in claim 2, wherein the zram driver stores a plurality of memory pages swapped out from the at least one swap disk by the at least one processor in a compressed format.

5. The memory management method in claim 2, wherein a step of setting the zram driver to the control parameter by the at least one processor comprises:
setting the control parameter by the at least one processor according to a balloon target of a balloon driver, a minimum memory requirement of the virtual machine system, and a basic memory requirement of the zram driver.

6. The memory management method in claim 5, wherein the step of setting the zram driver to the control parameter by the at least one processor comprises:
setting the control parameter by the at least one processor to a result of the balloon target of the balloon driver subtracted by a summation of the minimum memory requirement of the virtual machine system and the basic memory requirement of the zram driver.

7. The memory management method in claim 2, after a step of setting the zram driver to the control parameter by the at least one processor, directing a new swapped-out page from the zram driver to the at least one swap disk by the at least one processor if an amount of used memory in the zram driver exceeds the control parameter.

8. The memory management method in claim 2, wherein a step of adjusting the space in the zram driver by the at least one processor according to the plurality of access probabilities of the memory pages, the overhead of the pseudo page fault, and the overhead of the true page fault comprises:
obtaining a base term by the at least one processor, wherein the base term is a multiplication product of the access probability of a hottest memory page in the zram driver and the overhead of the pseudo page fault, wherein the hottest memory page is the memory page which has been accessed most recently among the memory pages in the second portion;
obtaining a comparison term by the at least one processor, wherein the comparison term is an accumulation sum of each multiplication product of at least one coldest memory page in the zram driver and the overhead of the true page fault, wherein the at least one coldest memory page is the at least one memory page has not been accessed most recently among the memory pages in the second portion;
decrementing the control parameter by the at least one processor if the base term is greater than the comparison term; and
shrinking the zram driver by the at least one processor according to the control parameter.

9. The memory management method in claim 8, wherein the base term satisfies an equation of $AP(N1+1) \times \text{Overhead}_{PPF}$, and wherein N1 is a number of the memory pages in the first portion, $AP(N1+1)$ represents an access probability of the $(N1+1)^{th}$ page on the LRU list, the $(N1+1)^{th}$ page represents the hottest memory page in the second portion, $\text{Overhead}_{PPF}$ represents the overhead of the pseudo page fault; wherein the comparison term satisfies an equation of $$\sum_{j=N_1+m}^{N_1+N_2} AP(j) \times \text{Overhead}_{TPF},$$

wherein N2 is a number of the memory pages in the second portion, $AP(j)$ represents an access probability of the $j^{th}$ page on the LRU list, $\text{Overhead}_{PPF}$ represents the overhead of the true page fault, a summation of the coldest (N2−m+1) compressed memory pages is less than one memory page size, a summation of the coldest (N2−m+2) compressed memory pages is greater than one memory page size.

10. The memory management method in claim 9, wherein the second portion of the memory pages are built in a local LRU list by the at least one processor, wherein the access probability of each of the memory pages on the local LRU list is estimated by an inverse of a page idle time, the overhead of the pseudo page fault is a time cost of the pseudo page fault, the overhead of the true page fault is a time cost of the true page fault, and wherein the page idle time is a difference between each of a plurality of memory pages being swapped-out and a current time.

11. A computer system comprising:
at least one system memory;
at least one swap disk, coupled to the at least one system memory;
at least one processor, coupled to the at least one system memory, wherein the at least one processor performs an operation for memory management on a virtual machine system, the operation comprising:
maintaining a least recently used (LRU) list according to a last access time, wherein the LRU list comprising a plurality of memory pages, and wherein a first portion of the memory pages in the LRU list are stored in a virtual memory on the virtual machine system, a second portion of the memory pages in the LRU list are stored in a zram driver on the virtual machine system, and a third portion of the memory pages in the LRU list are stored in the at least one swap disk;
setting a space in the zram driver;
adjusting the space in the zram driver according to a plurality of access probabilities of the memory pages in the zram driver, an overhead of a pseudo page fault, and an overhead of a true page fault.

12. The computer system in claim 11, wherein the at least one processor sets the space in the zram driver to a control parameter, wherein the control parameter is a number of memory pages assigned to the zram driver.

13. The computer system n claim 11, wherein the at least one processor further shrinks the space in the zram driver according to the plurality of access probabilities of the memory pages in the zram driver, the overhead of a pseudo page fault, and the overhead of a true page fault.

14. The computer system in claim 11, wherein the at least one processor swaps out the memory pages from the at least one swap disk and stores the swapped-out memory pages in the zram driver in a compressed format.

15. The computer system in claim 12, wherein the at least one processor sets the control parameter according to a balloon target of a balloon driver, a minimum memory requirement of the virtual machine system, and a basic memory requirement of the zram driver.

16. The computer system in claim 15, wherein the at least one processor sets the control parameter to a result of the balloon target of the balloon driver subtracted by a summation of the minimum memory requirement of the virtual machine system and the basic memory requirement of the zram driver.

17. The computer system in claim 12, wherein the at least one processor further directs a new swapped-out page from the zram driver to the at least one swap disk if an amount of used memory in the zram driver exceeds the control parameter.

18. The computer system in claim 12, wherein the at least one processor obtains a base term, obtains a comparison term, decrements the control parameter if the base term is greater than the comparison term, and shrinks the zram driver according to the control parameter, wherein the base term is a multiplication product of the access probability of a hottest memory page in the zram driver and the overhead of the pseudo page fault, wherein the hottest memory page is the memory page which has been accessed most recently among the memory pages in the second portion, wherein the comparison term is an accumulation sum of each multiplication product of at least one coldest memory page in the zram driver and the overhead of the true page fault, wherein the at least one coldest memory page is the at least one memory page has not been accessed most recently among the memory pages in the second portion.

19. The computer system in claim 18, wherein the base term satisfies an equation of $AP(N1+1) \times Overhead_{PPF}$, and wherein N1 is a number of the memory pages in the first portion, $AP(N1+1)$ represents an access probability of the $(N1+1)^{th}$ page on the LRU list, the $(N1+1)^{th}$ page represents the hottest memory page in the second portion, $Overhead_{PPF}$ represents the overhead of the pseudo page fault; wherein the comparison term satisfies an equation of $$\sum_{j=N_1+m}^{N_1+N_2} AP(j) \times Overhead_{TPF},$$

and wherein N2 is a number of the memory pages in the second portion, $AP(j)$ an access probability of the $j^{th}$ page on the LRU list, $Overhead_{PPF}$ represents the overhead of the true page fault, a summation of the coldest (N2−m+1) compressed memory pages is less than one memory page size, a summation of the coldest (N2−m+2) compressed memory pages is greater than one memory page size.

20. The computer system in claim 19, wherein the at least one processor build the second portion of the memory pages in a local LRU list, wherein the access probability of each of the memory pages on the local LRU list is estimated by an inverse of a page idle time, the overhead of the pseudo page fault is a time cost of the pseudo page fault, the overhead of the true page fault is a time cost of the true page fault, and wherein the page idle time is a difference between each of the memory pages being swapped-out and a current time.

* * * * *